(12) United States Patent
Venema et al.

(10) Patent No.: US 7,195,156 B2
(45) Date of Patent: Mar. 27, 2007

(54) PICK-TO-LIGHT SYSTEM FOR REPLENISHING MANUFACTURING KITS

(75) Inventors: Steven C Venema, Kirland, WA (US); James J Troy, Issaquah, WA (US); Michael L Callaghan, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/347,684

(22) Filed: Feb. 3, 2006

(65) Prior Publication Data

US 2006/0124743 A1 Jun. 15, 2006

Related U.S. Application Data

(63) Continuation of application No. 10/347,754, filed on Jan. 21, 2003, now Pat. No. 7,077,318.

(60) Provisional application No. 60/421,968, filed on Oct. 29, 2002.

(51) Int. Cl.
 *G06K 15/00* (2006.01)
(52) U.S. Cl. .................................. 235/383; 235/462.01
(58) Field of Classification Search ........... 235/462.01, 235/383, 385; 700/95, 115, 215, 242; 705/22, 705/23, 28, 29
See application file for complete search history.

(56) References Cited

U.S. PATENT DOCUMENTS

| | | | | |
|---|---|---|---|---|
| 3,739,339 A | * | 6/1973 | Hillhouse et al. | 340/5.9 |
| 4,025,766 A | * | 5/1977 | Ng et al. | 705/28 |
| 4,821,197 A | * | 4/1989 | Kenik et al. | 700/106 |
| 4,920,488 A | * | 4/1990 | Filley | 705/28 |
| 5,113,349 A | * | 5/1992 | Nakamura et al. | 700/215 |
| 5,455,409 A | * | 10/1995 | Smith et al. | 235/385 |
| 5,505,473 A | * | 4/1996 | Radcliffe | 280/79.2 |
| 5,812,986 A | * | 9/1998 | Danelski | 705/22 |
| 5,877,962 A | * | 3/1999 | Radcliffe | 700/215 |
| 6,124,800 A | * | 9/2000 | Beard et al. | 340/5.9 |
| 6,236,901 B1 | * | 5/2001 | Goss | 700/95 |
| 6,427,091 B1 | * | 7/2002 | Davis et al. | 700/115 |
| 6,711,458 B1 | * | 3/2004 | Kofoed | 700/213 |

* cited by examiner

*Primary Examiner*—Thien M. Le
*Assistant Examiner*—Kumiko C. Koyama
(74) *Attorney, Agent, or Firm*—Harness, Dickey & Pierce, P.L.C.

(57) ABSTRACT

An inventory management system and method for replenishing manufacturing kits includes a shelving system, a mobile pick station, a data server, and a network node proxy. The mobile pick station communicates with both the shelving system via the network node proxy, and to the data server via a communications interface. Manufacturing kit specification data is supplied to the system through the data server and is thus used to generate a map of the manufacturing kit onto a touchscreen display located on the mobile pick station. The map displays the type, quantity, and placement of parts within the manufacturing kit. System components are tracked using a barcode system that reduces the frequency of incorrectly selected and placed parts.

17 Claims, 6 Drawing Sheets

PICK-TO-LIGHT SYSTEM FOR REPLENISHING MANUFACTURING KITS

CROSS-REFERENCE TO RELATED APPLICATIONS

This application claims priority to U.S. Pat. No. 7,077,318 filed on Jan. 21, 2003, which in turn claims priority to U.S. patent application Ser. No. 60/421,968 filed on Oct. 29, 2002, the disclosures of which are incorporated herein by reference.

FIELD OF THE INVENTION

The present invention relates to an inventory management system, and more specifically, to a system and method for replenishing manufacturing kits using a pick-to-light system.

DISCUSSION OF THE INVENTION

The inventory management system according to the present invention reduces labor costs and decreases the inaccuracies of manual kit replenishment systems. The present replenishing system provides a shelving system electronically divisible into racks, each rack having vertical and horizontal channels containing shelf communication circuitry. Within each rack there are a plurality of storage bins containing the parts needed for replenishing the manufacturing kits. Each storage bin and manufacturing kit are identified by barcodes and read into the system with scanners.

A rack control unit located proximate each rack includes a rack processor in communication with other rack processors via a communications bus linking racks within the shelving system. It also controls shelf electronics embedded within the vertical and horizontal channels of each rack and indirectly communicates to a pick station processor located on a mobile pick station through a network node proxy.

The mobile pick station includes a touchscreen display, a barcode scanner, a pick-station processor and a network interface. The pick-station processor communicates with a remote data server that provides specification data for each manufacturing kit. From the specification data, a map of the manufacturing kit is generated and displayed onto the touchscreen display. This map guides the user through a kit replenishment process.

In addition to replenishing manufacturing kits, the system of the present invention can also be used to replenish the parts in the storage bins.

Further areas of applicability of the present invention will become apparent from the detailed description provided hereinafter. It should be understood that the detailed description and specific examples are intended for purposes of illustration only and are not intended to limited the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred-embodiment(s) is merely exemplary in nature and is in no way intended to limit the invention, its application, or uses.

Figure 1:
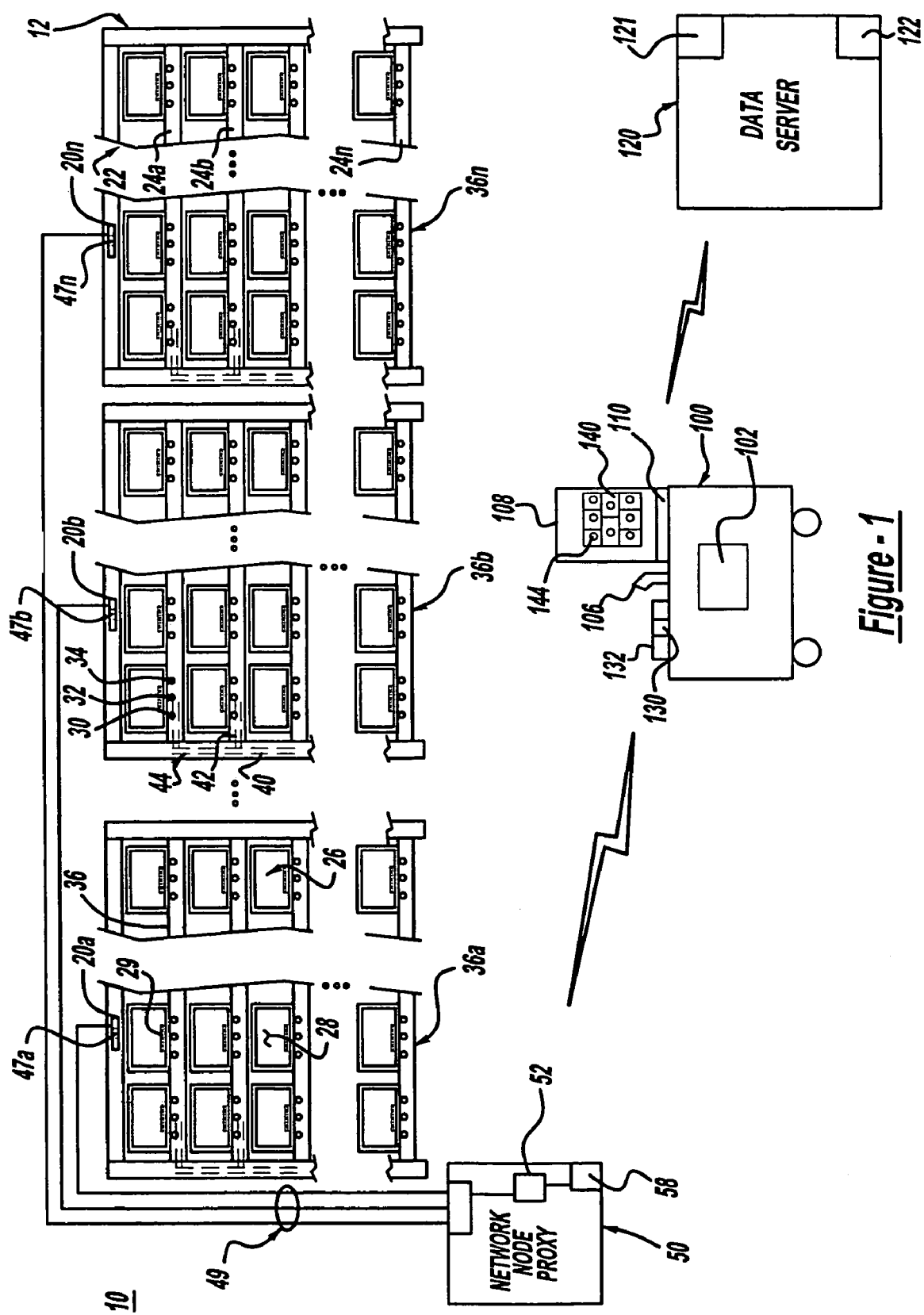
FIG. 1 is a schematic illustration of a pick-to-light system of the present invention.

FIG. 1 illustrates an inventory management system for replenishing manufacturing kits using a pick-to-light system 10 that generally includes a shelving system 12, a network node proxy 50, a mobile pick-to-light cart 100, and a data server 120. Shelving system 12 is electrically divisible into racks 36a, 36b . . . 36n each having individual rack control units 20a, 20b . . . 20n. Multiple columns of racks 36a, 36b . . . 36n, each having shelves 24a, 24b . . . 24n, are shown. More or fewer racks of shelves may be included, but seven shelves per rack is typical.

The rack structure of shelving system 12 is constructed with vertical and horizontal channels 40, 42 that house system communication circuitry 44 including shelf electronics and rack communication circuitry. Rack control units, located proximate to each rack 36a, 36b . . . 36n include rack processors 47a, 47b . . . 47n. Peer-to-peer communication between racks 36a, 36b . . . 36n is accomplished via a node communications bus 49 connected to each rack processor 47a, 47b . . . 47n within rack control units 20a, 20b . . . 20n.

Each shelf 24a, 24b . . . 24n holds several storage bins 26. Depending upon the system design, the number of shelves 24a, 24b . . . 24n and storage bins 26 may vary, but seven or eight storage bins 26 per shelf 24a, 24b . . . 24n is typical. Each storage bin 26 has a label designation referred to as a pick-face 28 that includes a barcode 29 identifying, for example, the part number, type and quantity of each part. Located below each pick-face 28 is a group of indicator lights or pick-lights, generally one red 30, one yellow 32 and one green 34. Pick-lights 30, 32, 34 can be assigned for different purposes including, but not limited to, one light used for a person replenishing kits, a second for a person assembling a different kit that may use some of the same parts, and a third for a person restocking the kit bins.

Network node proxy 50 includes a node processor 52 communicating with rack control units 20a, 20b . . . 20n via node communications bus 49. In addition, network node proxy 50 receives and processes commands from mobile pick station 100 via an Ethernet or other communication platform through network interface 58. Preferably, network interface 58 is a wireless network interface.

Mobile pick station 100 includes a pick station processor 102 in communication with a barcode scanner 106, a touchscreen display 108, and a network interface 110. Network interface 110 communicates with data server 120 and network node proxy 50. Preferably, such communication is wireless. The examples used herein are applicable to one mobile pick station 100, however, multiple pick stations 100 can be used simultaneously for different tasks.

Data server 120 includes databases, images, and programs needed to operate the pick-to-light system 10. In addition, data server 120 includes a web server 121 for processing web-related applications. Generally, the communication between mobile pick station 100 and data server 120 is via communications interface 122 and is preferably wireless. Other equivalent communication platforms may also be used.

The pick-to-light system 10 is capable of replenishing one or more manufacturing kits 132 simultaneously using a barcode 130 to track each manufacturing kit 132. Barcode 130 affixes to the outside of each manufacturing kit 132 providing specification information relating to the type of parts needed for replenishment, the cost, and the quantity and location of each part within the manufacturing kit 132.

Figure 2:
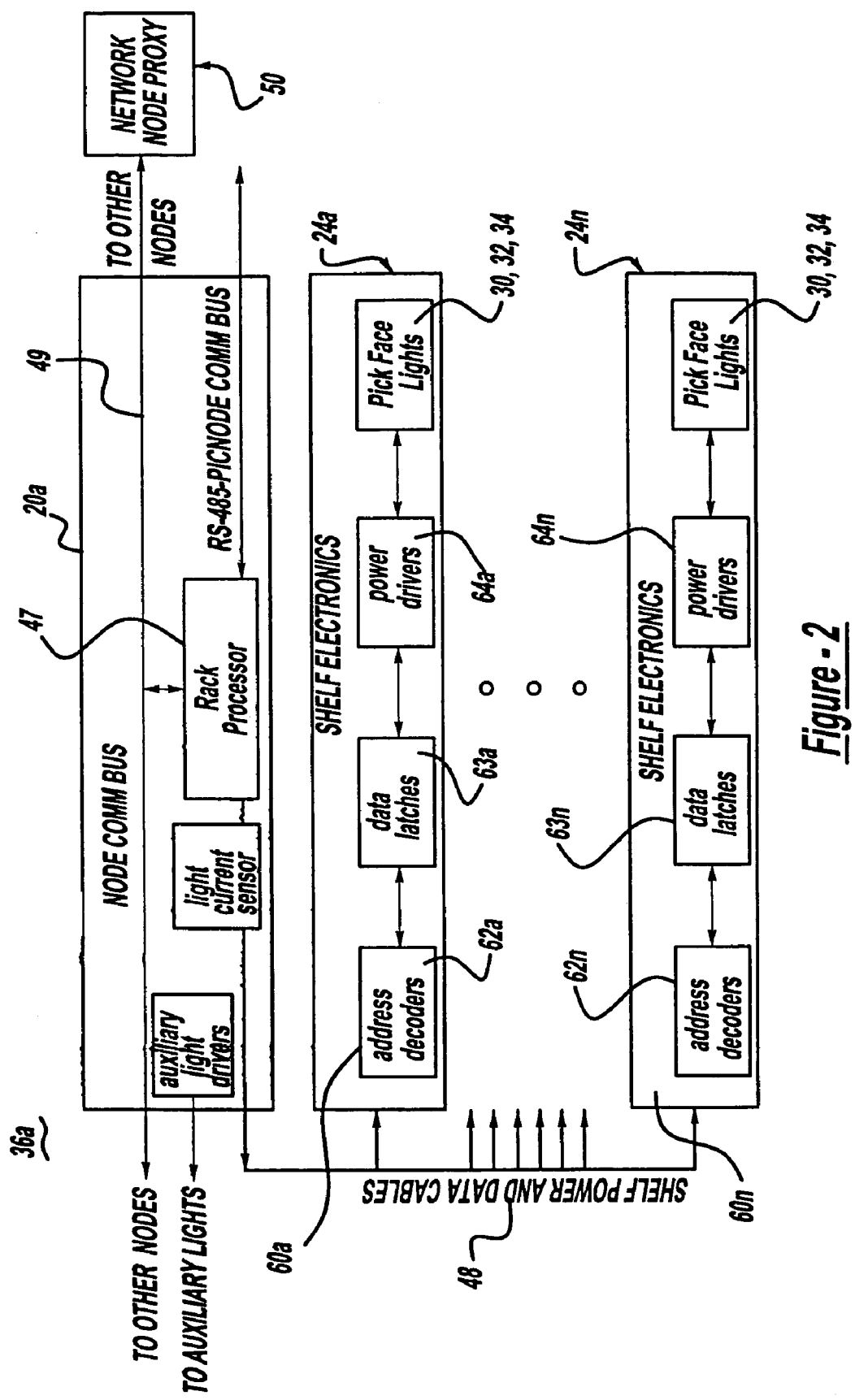
FIG. 2 is an illustration of a rack system for the pick-to-light system according to the present invention.

FIG. 2 is a schematic representation of shelving system 12 electronics embedded within vertical and horizontal channels 40, 42. Each rack 36a, 36b . . . 36n includes a rack control unit 20a, 20b . . . 20n providing power, control, and communication through power and data cables 48. Each rack control unit 20a, 20b . . . 20n has a rack processor 47a, 47b . . . 47n connected to a communications bus 49 that provides a communications link to network node proxy 50 and to other rack processors 47a, 47b . . . 47n. Rack processor 47a, 47b . . . 47n also monitors the status of the pick-face lights 30, 32, 34 and controls other shelf electronics 60a, 60b . . . 60n such as a shelf address decoders 62a, 62b . . . 62n, data latches 63a, 63b . . . 63n, and power drivers 64a, 64b . . . 64n. Shelf electronics 60a, 60b . . . 60n are connected to rack control units 20a, 20b . . . 20n through data cables 48 embedded within vertical and horizontal channels 40, 42.

Figure 3A:
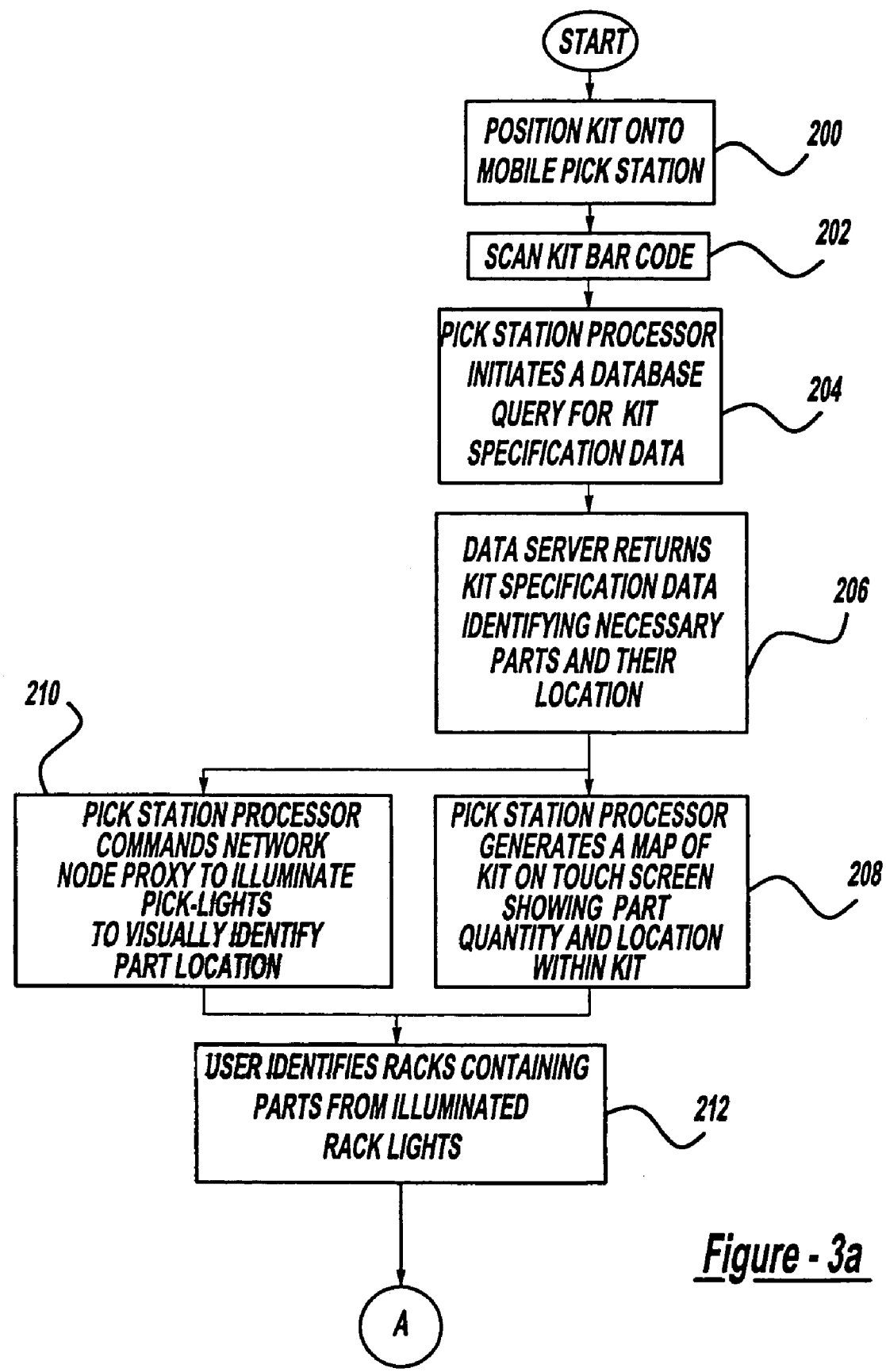
FIGS. 3a and 3b depict a flow diagram for a pick-to-light method according to the invention.
Figure 3B:
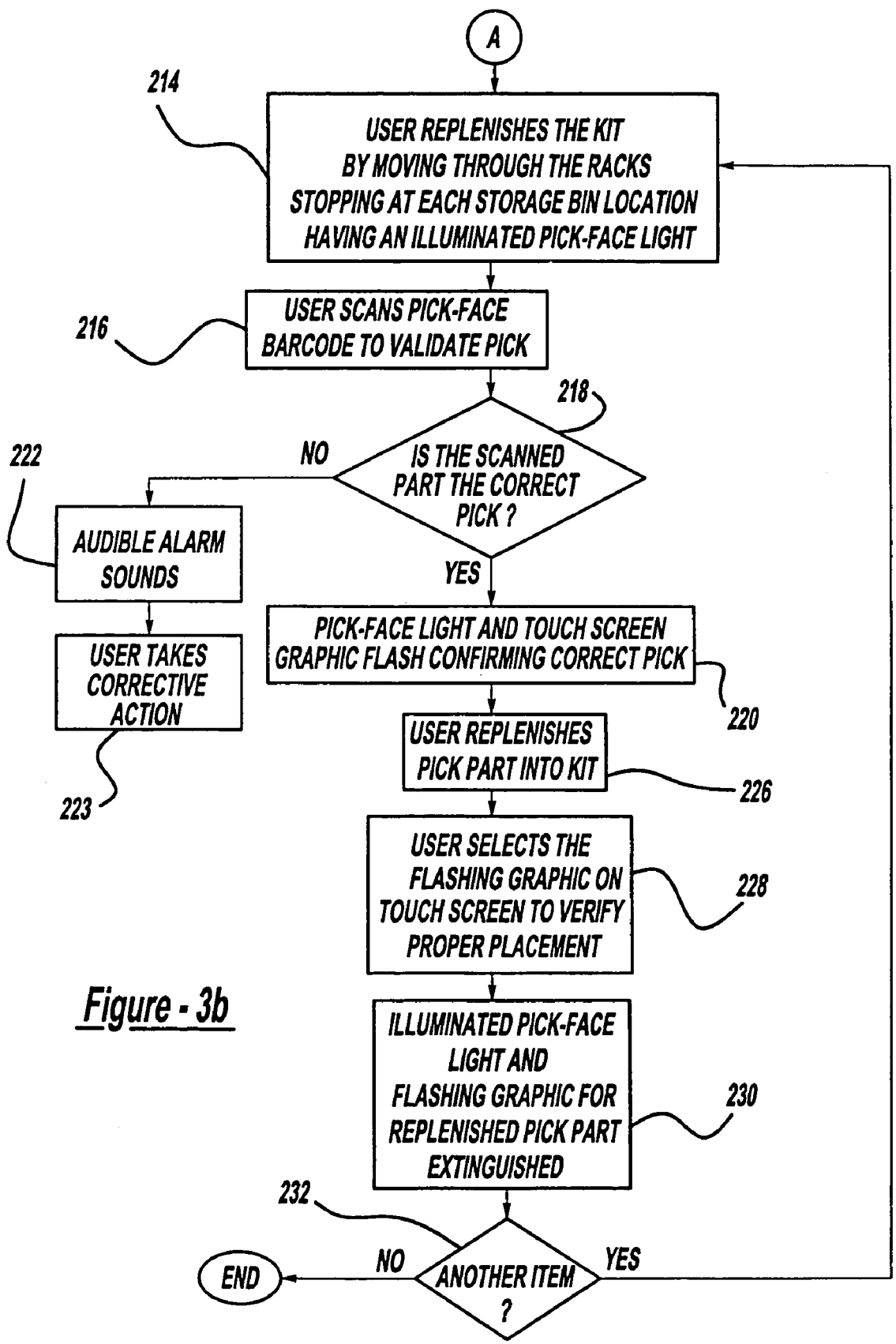

As shown in FIGS. 3a and 3b, a method according to the invention begins at operations 200 and 202, respectively, by placing a manufacturing kit 132 onto mobile pick-station 100 and scanning the kit barcode 130 using the mobile pick station scanner 106. Upon scanning at operation 204, pick station processor 102 initiates a database query to data server 120 for kit specification data via network interface 110. At operation 206, the query provides mobile pick station 100 with kit specification data identifying the parts needed for replenishment and their locations.

At operation 208 the retrieved data is used to generate a map 140 of the selected manufacturing kit 132 onto touch-screen display 108, which is located on mobile pick station 100. The map 140, shown in FIG. 4, visually represents an overlay of the manufacturing kit 132 and shows the respective specification data including the kit compartments 150. A color-coded graphic 144, located inside each of the compartments 150, is coded to match the color of illuminated pick-light 30, 32, 34. Inside the color-coded graphic 144 there is information 148 representing the type of part needed for that particular compartment 150, and the quantity and storage bin location 26 of the particular part.

In conjunction with operation 208, the specification data retrieved by the query of operation 206 is used by the pick station processor 102 at operation 210 to command the network node proxy 50 to illuminate one of the three pick-lights 30, 32, 34 located below the pick-face 28 associated with each bin 26, for each part in the selected kit 132. At operation 212, the map 140 and illuminated pick-lights 30, 32, 34 guide the user to the location of the parts needed to replenish the manufacturing the kit 132.

As previously mentioned, the system 10 is capable of replenishing more than one manufacturing kit 132, simultaneously. The currently displayed map 140 is shown in a list of active kits 141. The user may change the displayed kit by selecting the desired kit from the listing 141. In addition, the system 10 can also perform tasks such as restocking the storage bins and servicing emergent requirements. For example, a red pick-face light may indicate a part is needed for kit replenishment, while the same set of pick-face lights 30, 32, 34 has a yellow light illuminated representing a servicing emergent requirement. Further, a green light may be lit to represent parts needing to be restocked. This multi-tasking allows more than one user to use the system at the same time. An emergent requirement process is discussed below.

Figure 4:
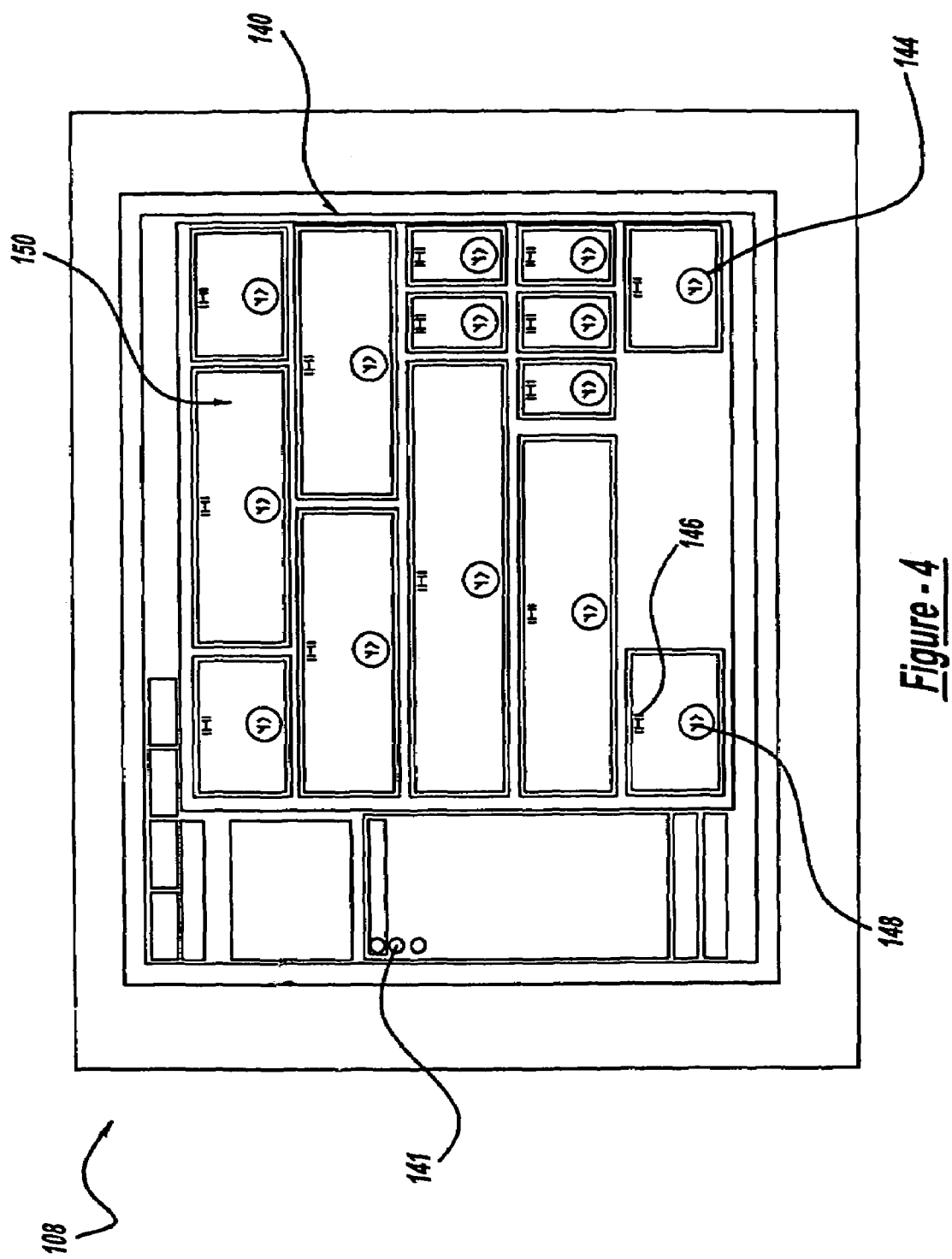
FIG. 4 is a screen shot of a touch screen interface for the pick-to-light system of the present invention.

Continuing with FIG. 3b, at operation 214, a user replenishes a kit 132 by moving mobile pick station 100 to each storage bin 26 location having an illuminated pick-face light 30, 32, 34. At operation 216, once the user is at the storage bin location 26, the user scans the pick-face barcode 29, using the scanner 106, to validate the pick. At operation 218, the system 10 determines whether the correct pick-face 28 was scanned. At operation 220, if the correct pick-face 28 was scanned, at least one illuminated pick-face light 30, 32, 34 and color-coded graphic 144 begin to flash confirming the correct selection. The flashing color-coded graphic 144 is intended to guide the user to place the selected part into the proper kit compartment 150. A photo of the desired part, along with other specification data, is displayed on the map 140 as shown in FIG. 4. At operation 222, if an incorrect pick-face 28 was selected, an audible alarm sounds indicating to the user that the wrong pick-face 28 was scanned and the correct part needs to be located. At operation 223, the user takes corrective action to resolve the error.

After replenishing the part into the kit at operation 226, the user selects the flashing graphic 144 on the touch screen 108, at operation 228, to reconfirm that the part has been placed in the correct compartment 150. By selecting the flashing graphic 144 at operation 230, the correct placement of the part is confirmed and one or more of the illuminated pick-face lights 30, 32, 34 and the flashing graphic are extinguished. At operation 232, the user moves to the next illuminated pick-face light 30, 32, 34 to make another selection until the kit is completely replenished.

Figure 5:
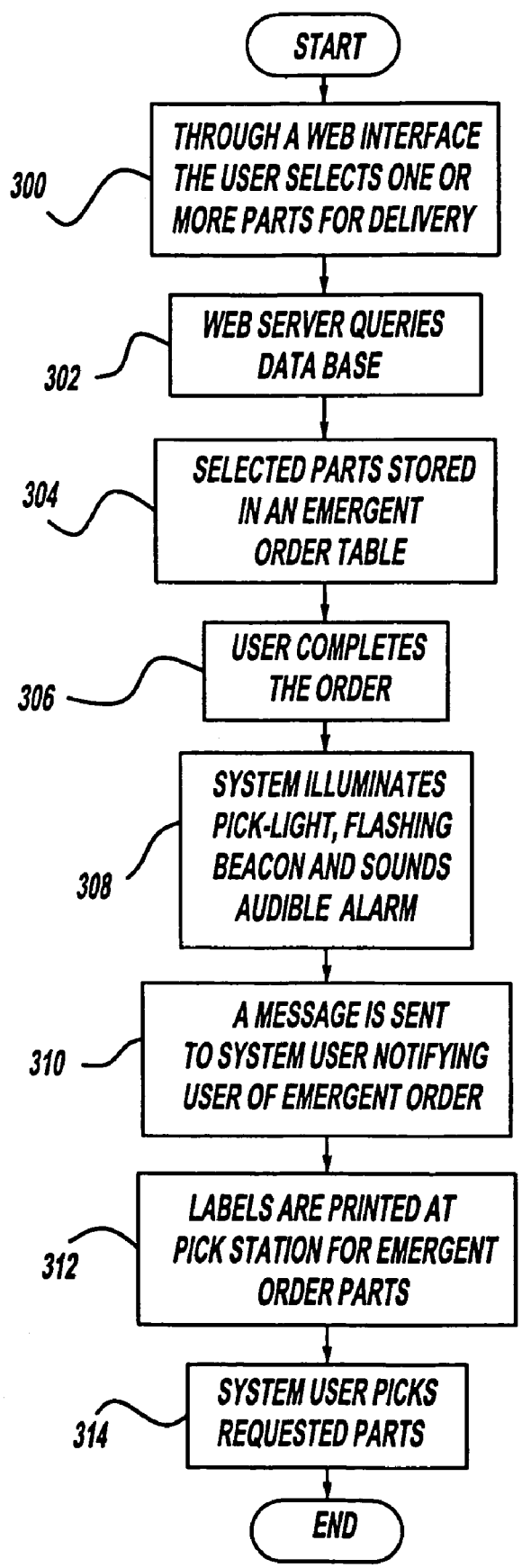
FIG. 5 depicts a flow diagram for servicing emergent requirement with a pick-to-light method according to the inventor.

FIG. 5 illustrates a method according to the present invention for servicing emergent requirements. An emergent requirement is an unanticipated need received from the factory floor for a pick part that was either not found in the kit being on the part was found defective. In either case, the part is needed on the factory floor quickly.

At operation 300, a user, typically a floor mechanic from the work site, using a web interface, orders the parts needed to complete a job. At operation 302, once the parts are selected, the web server 121 queries a database for information related to the selected parts. The selected parts are stored into an emergent order table at operation 304, until the user completes the order at operation 306. The system 10 sends the request to the pick area and notifies the user by illuminating one or more of the corresponding pick-lights 30, 32, 34, by flashing a beacon light and by sounding an audible alarm. In addition, the system 10 sends a message at operation 310, generally via an alphanumeric pager, to the pick area user communicating the emergent requirement order. Labels are printed at operation 312 at the pick station 100 for labeling special order part bags. At operation 314, the pick area user fills the emergent order in the same manner as the kit replenishment process explained above. Preferably, an emergent order can be filled and delivered to the user within three minutes of requesting the order.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A mobile parts station for use in a manufacturing process, comprising:

a manufacturing kit having a plurality of independent part compartments for holding differing compent parts to be used in a specific work task;

a network interface to receive manufacturing kit specification data;

a processor in communication with said network interface to process said received manufacturing kit specification data and to provide information to a user to aid said user in replenishing said manufacturing kit with parts from an external parts supply;

a barcode scanner in communication with said processor to read barcode data associated with said manufacturing kit, to thus inform said processor of a specific type of said manufacturing kit being used;

a display in communication with said processor for generating a manufacturing kit map for guiding replenishment of parts to said kit, said kit map including a map overlay illustrating said manufacturing kit; and said display allowing a user to select a specific one of a plurality of differing manufacturing kits from said display before beginning a part replenishment operation.

2. The mobile parts station of claim 1, wherein said map overlay includes colors placed in said various areas of said map overlay representing said independent part compartments, to aid a user in replenishing said part compartments of said manufacturing kit.

3. The mobile parts station of claim 2, wherein said colors correspond in color to illuminated indicators used with said external parts supply to further assist a user in locating a specific part to added to said manufacturing kit during a part replenishment operation.

4. The mobile parts station of claim 3, wherein each said independent part compartment presented on said map overlay on said display also includes indicia relating to specific part information for a specific part that is held in a given one of the part compartments of said manufacturing kit.

5. A mobile parts apparatus for use in a manufacturing process, comprising:
a manufacturing kit having a plurality of independent part compartments for holding differing component parts to be used in a specific work task;
a network interface to receive manufacturing kit specification data from an external system; a processor in communication with said network interface to process said received manufacturing kit specification data;
a display in communication with said processor for displaying an overlay of said manufacturing kit illustrating each said part compartment of said manufacturing kit;
a barcode scanner in communication with said processor to read barcode data associated with said manufacturing kit, to thus inform said processor of a specific type of said manufacturing kit being used by the apparatus; and
said display generating different colors, in response to signals from said processor, for said parts compartments of said overlay being displayed on said display that correspond with specific parts bins of an external parts storage system, to further aid said user in identifying locations of said external parts storage system where parts are to be obtained from during a part replenishing operation being performed on said manufacturing kit.

6. The apparatus of claim 5, wherein a plurality of different colors are used on said display for different parts compartments being displayed by said overlay.

7. The apparatus of claim 6, wherein said display causes one of said colors to flash during said parts replenishment process.

8. The apparatus of claim 6, wherein at least one of said colors includes part information.

9. The apparatus of claim 6, wherein said network interface comprises a wireless network interface.

10. The apparatus of claim 5, wherein said display includes a provision for enabling a user to select from one of a plurality of manufacturing kits available for use with said apparatus.

11. The apparatus of claim 5, wherein said apparatus is used with an independent part storage system having a plurality of lights that assist, in cooperation with said lights on said overlay being displayed on said display, a user replenishing parts into said compartments of said manufacturing kit.

12. A mobile parts station for use in a manufacturing process, comprising:
a manufacturing kit having a plurality of independent part compartments for holding differing component parts to be used in a specific work task;
a network interface to receive manufacturing kit specification data from an external data source;
a processor in communication with said network interface to process said received manufacturing kit specification data and to provide information to a user to aid said user in replenishing said manufacturing kit with parts from an external parts supply;
a barcode scanner in communication with said processor to read barcode data on said manufacturing kit, used to identify said manufacturing kit, to thus inform said processor of a specific type of said manufacturing kit being used;
said mobile parts station further being in communication with said external data source to obtain part information during a part replenishing operation performed on said manufacturing kit;
an interactive display for displaying an overlay map of said manufacturing kit on said display, said overlay map illustrating said independent part compartments of said manufacturing kit, each of said part compartments able to be illuminated with a predetermined color and indicia to assist a user in replenishing said manufacturing kit; and
said interactive display enabling a user to select a specific manufacturing kit to be displayed on said display from a plurality of different displays being displayed on said display.

13. The mobile parts station of claim 12, wherein said display displays different colors for different ones of said independent part compartments being displayed.

14. The mobile parts station of claim 12, wherein said interactive display operates to cause at least one of said colors to flash during a part replenishing operation being performed on said manufacturing kit.

15. The mobile parts station of claim 12, wherein said bar code scanner operates to scan a barcode from an external parts storage system, said barcode from said external parts storage system representing a specific part being taken from said external parts storage system.

16. The mobile parts station of claim 12, wherein said bar code information from said external parts storage system is used by said processor to cause said display to flash one of said lights representing a specific storage compartment on said manufacturing kit, to thus aid a user in placing a specific part into a specific one of said compartments of said manufacturing kit.

17. The mobile parts station of claim 16, wherein said interactive display operates to display a picture of a specific part during a part replenishing process.

* * * * *